United States Patent
Kikuchi et al.

(10) Patent No.: US 11,360,281 B2
(45) Date of Patent: Jun. 14, 2022

(54) OPTICAL FIBER CABLE, AND DEVICE AND METHOD FOR MANUFACTURING OPTICAL FIBER CABLE

(71) Applicant: NIPPON TELEGRAPH AND TELEPHONE CORPORATION, Tokyo (JP)

(72) Inventors: Masashi Kikuchi, Tsukuba (JP); Yusuke Yamada, Tsukuba (JP); Hisashi Izumita, Tsukuba (JP); Junichi Kawataka, Tsukuba (JP); Kazunori Katayama, Tsukuba (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/256,965

(22) PCT Filed: Jul. 2, 2019

(86) PCT No.: PCT/JP2019/026334
§ 371 (c)(1),
(2) Date: Dec. 29, 2020

(87) PCT Pub. No.: WO2020/009116
PCT Pub. Date: Jan. 9, 2020

(65) Prior Publication Data
US 2021/0132314 A1 May 6, 2021

(30) Foreign Application Priority Data
Jul. 3, 2018 (JP) .............................. JP2018-126696

(51) Int. Cl.
*G02B 6/44* (2006.01)

(52) U.S. Cl.
CPC .......... *G02B 6/441* (2013.01); *G02B 6/4479* (2013.01)

(58) Field of Classification Search
CPC ............................. G02B 6/441; G02B 6/4479
(Continued)

(56) References Cited

U.S. PATENT DOCUMENTS

| | | | |
|---|---|---|---|
| 2017/0343751 A1* | 11/2017 | Bookbinder | ......... G02B 6/4403 |
| 2018/0321453 A1 | 11/2018 | Sato et al. | |
| 2020/0183111 A1* | 6/2020 | Sato | ......... G02B 6/44 |

FOREIGN PATENT DOCUMENTS

| | | |
|---|---|---|
| JP | H07234348 A | 9/1995 |
| JP | 2012208223 A | 10/2012 |

(Continued)

OTHER PUBLICATIONS

M. Kikuchi, et al. "Advanced optical characteristics of SZ-stranded high-density 1000-fiber cable with rollable 80-opitcal-fiber ribbons", Proc. of the 65th IWCS Conf., pp. 588-593, Nov. 2011.
(Continued)

*Primary Examiner* — Jerry M Blevins
(74) *Attorney, Agent, or Firm* — Harness, Dickey & Pierce, P.L.C.

(57) ABSTRACT

An intermittent tape core wire (140) of an optical fiber cable is assembled into a cable core so that in a k core wire, an l core wire, and an m core wire composed of a multi-core optical fibers continuously adjacent in the width direction of the intermittent tape core wire (140), a difference θ between a core wire twisting direction $D2_{km}$ of the k core wire at a bonding portion (142) connecting the k core wire and the l core wire and a core wire twisting direction $D2_{kl}$ of the k core wire at a bonding portion (142) connecting the k core wire and the m core wire is different from when manufactured.

6 Claims, 15 Drawing Sheets

(58) Field of Classification Search
USPC .......................................................... 385/100
See application file for complete search history.

(56) References Cited

FOREIGN PATENT DOCUMENTS

| | | |
|---|---|---|
| JP | 2016020989 A | 2/2016 |
| JP | 2016206353 A | 12/2016 |
| JP | 2017009629 A | 1/2017 |
| JP | 2017076017 A | 4/2017 |
| JP | 2017156558 A | 9/2017 |
| JP | 2017173514 A | 9/2017 |
| WO | WO-2017131118 A1 | 8/2017 |
| WO | WO-2017217559 A1 | 12/2017 |

OTHER PUBLICATIONS

T. Sakamoto, T. Mori, M. Wada, T. Yamamoto, F. Yamamoto, "Coupled Multicore Fiber Design With Low Intercore Differential Mode Delay for High-Density Space Division Multiplexing", J. J. Lightw Technol., vol. 33, No. 6, pp. 1175, 1181, (2015).
International Search Report Issued in PCT/JP2019/026334, dated Aug. 27, 2019.

\* cited by examiner (2A-2A' CROSS-SECTION)

(2B-2B' CROSS-SECTION)

(3A-3A' CROSS-SECTION)

(3B-3B' CROSS-SECTION)

(8A-8A' CROSS-SECTION)

(8B-8B' CROSS-SECTION)

OPTICAL FIBER CABLE, AND DEVICE AND METHOD FOR MANUFACTURING OPTICAL FIBER CABLE

CROSS-REFERENCE TO RELATED APPLICATIONS

This is a U.S. national phase application under 35 USC 371 of international application PCT/JP2019/026334, filed on Jul. 2, 2019, which claims priority to Japanese patent application No. 2018-126696, filed on Jul. 3, 2018. The entire disclosures of the above applications are incorporated herein by reference.

TECHNICAL FIELD

The present invention relates to an optical fiber cable, and a device and a method for manufacturing an optical fiber cable.

BACKGROUND ART

In recent years, a small-diameter and high-density optical fiber cable has been studied as an optical fiber cable that can effectively use the space of infrastructures such as underground ducts to dispose a large number of optical fibers (Non Patent Literature 1).

In the optical fiber cable, in order to collectively connect the optical fibers efficiently, a structure of optical fiber tape core wire is employed in which the optical fibers are aligned and bonded. In particular, in the small-diameter and high-density optical fiber cable, in order to mount the optical fibers in high-density, an optical fiber core wire takes a form of intermittently bonded optical fiber tape core wire in which bonding portions are intermittently provided in the longitudinal direction.

Meanwhile, in an optical fiber communication system, transmission capacity is limited by non-linear effects or a fiber fuse generated in the optical fibers. To mitigate the limitation of the transmission capacity, spatial multiplex transmission technology such as parallel transmission using a multi-core optical fiber (hereinafter MCF), and mode multiplex transmission using a multi-mode fiber (hereinafter MMF) in which a plurality of propagation modes exists in the core are discussed.

In the spatial multiplex transmission technology, when the spatial multiplex transmission is made high-density, coupling is generated between transmission lines such as between the cores of the MCF and between modes of the MMF, leading to deterioration in transmission quality.

This deterioration in transmission quality can be compensated at a reception end using Multi-Input and Multi-Output (MIMO) techniques, and the transmission quality can be maintained while the spatial multiplex transmission is made high-density. When applying the MIMO technology, however, if the group delay difference (DMD) between a plurality of signal lights is large, the queue for compensating signal processing increases in a delay direction, leading to signal processing complexity.

With respect to the MCF in particular, the relationship between an intercore distance and the DMD is known by Non Patent Literature 2, and there is a lower limit for the intercore distance that can be achieved without increasing the DMD, even given the application of the MIMO technology.

The DMD can be suppressed by actively generating a coupling between the transmission lines. By applying twisting to the optical fiber core wire, the coupling between the transmission lines can be facilitated (PTL 1).

CITATION LIST

Patent Literature

Patent Literature 1: JP 2017-9629 A

Non Patent Literature

Non Patent Literature 1: M. Kikuchi, et al. "Advanced optical characteristics of SZ-stranded high-density 1000-fiber cable with rollable 80-optical-fiber ribbons", Proc. of the 65th IWCS Conf., pp. 588-593, November 2011.

Non Patent Literature 2: T. Sakamoto, Mori, M. Wada, T. Yamamoto, F. Yamamoto, "Coupled Multi core Fiber Design With Low Intercore Differential Mode Delay for High-Defferential Mode Delay for High-Density Space Division Multiplexing", J. J. Lightw Technol., vol. 33, no. 6, pp. 1175, 1181, (2015).

SUMMARY OF THE INVENTION

Technical Problem

When constituted into a cable, there is the following problem in applying twisting to an optical fiber core wire.

In a case of a cable constituted of a single-core covered optical fiber, there is a problem in that when applying twisting, the constraint force is insufficient due to the need to suppress optical loss of the optical fiber core wire and thus twisting of the optical fiber core wire is restored when the twisting angle per unit length (hereinafter, twisting speed) is increased.

Meanwhile, there is an optical cable having a structure of an optical fiber tape core wire in which a plurality of single-core covered optical fibers are arranged in parallel to be bonded to adjacent core wires. The structure of the optical fiber tape core wire broadly classified into two types. One is a structure in which optical fibers are bonded over the entire length in the longitudinal direction, and another is a structure of intermittently bonded optical fiber tape core wire in which a plurality of adjacent locations of the optical fibers in parallel are boded over the longitudinal direction and the width direction. Hereinafter, the intermittently bonded optical fiber tape core wire is referred to simply as an intermittent tape core wire as appropriate.

In the former, the single-core covered optical fibers in parallel are integrated, stress is applied to the single-core covered optical fibers when assemble into a cable core, and thus it is necessary to provide a slot rod in the cable core to suppress deformation of the optical fiber tape core wire. As a result, there is a problem that an initial purpose of densification of transmission lines cannot be achieved.

In the latter, since bonding portions are local, stress applied to the single-core covered optical fibers is suppressed even when assembled into a cable core, and thus it is possible to be assembled in high density.

It is, however, difficult to apply twisting to an intermittent tape core wire for the following reasons. When intermittent tape core wires are assembled into a cable core, if twisting is applied to the intermittent tape core wires, the intermittent tape core wires are assembled while forming a spiral with an adjacent optical fiber core wire as an axis, and thus bending occurs. The bending is problematic in that it leads to an excessive increase in optical loss of the optical fiber. Further, when the intermittent tape core wire is manufactured, if the individual single-core covered optical fibers are formed to the intermittent tape while being twisted, the intermittent tape core wire is not aligned in a line in the cross-section of the optical fibers, leading to a problem of deteriorated workability.

From the above, there is a problem in achieving an optical cable in which the intermittent tape core wire is twisted and assembled.

The present invention has been made in light of the problems described above, and an object of the present invention is to provide an optical fiber cable and a device and a method for manufacturing the optical fiber cable in which intermittent tape core wires are assembled in high-density with securing workability while generating the twisting in the single-core covered optical fibers.

Means for Solving the Problem

A first aspect of the present invention is an optical fiber cable, wherein an intermittently bonded optical fiber tape core wire is assembled into a cable core and subjected to application of a jacket, in which the intermittently bonded optical fiber tape core wire is provided with bonding portions at a plurality of locations two dimensionally in a longitudinal direction and in a width direction, the bonding portions bonding two adjacent cores of three or more single-core covered optical fibers that are multi-core optical fibers having a plurality of cores and subjected to application of a cover on the outer periphery. In the optical fiber cable, the intermittently bonded optical fiber tape core wire is assembled into the cable core so that with respect to a k core wire located in the center and an l core wire and an m core wire located on both sides among core wires of three single-core covered optical fibers continuously adjacent in the width direction, a difference between a core wire twisting direction of the k core wire at a bonding portion connecting the k core wire and the l core wire and a core wire twisting direction of the k core wire at a bonding portion connecting the k core wire and the m core wire is different from when manufactured.

A second aspect of the present invention is a device for manufacturing an optical fiber cable. The device for manufacturing the optical fiber cable includes: a plurality of core wire feed-out sections configured to feed out a plurality of intermittently bonded optical fiber tape core wires each including a plurality of multi-core optical fibers, a plurality of alignment orientation control sections configured to control alignment orientations of the plurality of intermittently bonded optical fiber tape core wires so that lined-up orientations of the core wires of the ted out plurality of intermittently bonded optical fiber tape core wires are different from each other, and a core wire assembling section configured to assemble the plurality of intermittently bonded optical fiber tape core wires into a cable core while maintaining the lined-up orientations of the core wires.

A third aspect of the present invention is a method for manufacturing an optical fiber cable. The method for manufacturing the optical fiber cable includes: feeding out a plurality of intermittently bonded optical fiber tape core wires each including a plurality of multi-core optical fibers, controlling alignment orientations of the plurality of intermittently bonded optical fiber tape core wires so that lined-up orientations of the core wires of the fed out plurality of intermittently bonded optical fiber tape core wires are different from each other, and assembling the plurality of intermittently bonded optical fiber tape core wires into a cable core while maintaining the lined-up orientations of the core wires.

A fourth aspect of the present invention is a device for manufacturing an optical fiber cable. The device for manufacturing the optical fiber cable includes: a core wire feed-out section configured to feed out an intermittently bonded optical fiber tape core wire; a deformation imparting section configured to impart deformation to the fed out intermittently bonded optical fiber tape core wire; and a core wire assembling section configured to assemble the intermittently bonded optical fiber tape core wire that is deformed into a cable core while maintaining the deformation. The deformation imparting section includes a groove configured to receive the intermittently bonded optical fiber tape core wire. The groove has a concave cross-sectional shape. The intermittently bonded optical fiber tape core wire includes a plurality of single-core covered optical fibers composed of multi-core optical fibers, and the width of the bottom surface of the groove is less than or equal to $(n-1)d$, where n is the number of the core wires of the single-core covered optical fibers and the d is diameter.

A fifth aspect of the present invention is a method for manufacturing an optical fiber cable. The method for manufacturing the optical fiber cable includes: feeding out an intermittently bonded optical fiber tape core wire in a flat state; deforming the intermittently bonded optical fiber tape core wire by receiving the fed out intermittently bonded optical fiber tape core wire with a groove having a concave cross-sectional shape; and assembling the intermittently bonded optical fiber tape core wire that is deformed into a cable core while maintaining the deformation. The intermittently bonded optical fiber tape core wire includes a plurality of single-core covered optical fibers composed of multi-core optical fibers, and the width of the bottom surface of the groove is less than or equal to $(n-1)d$, where n is the number of the core wires of the single-core covered optical fibers and d is the diameter.

Effects of the Invention

According to the first aspect of the present invention, the intermittently bonded optical fiber tape core wire is assembled into the cable core so that a difference between a core wire twisting direction of the k core wire at a bonding portion connecting the k core wire and the l core wire and a core wire twisting direction of the k core wire at a bonding portion connecting the k core wire and the m core wire is different from when manufactured. As a result, twisting occurs in the single-core covered optical fiber of the k core wire of the intermittently bonded optical fiber tape core wire. Furthermore, since the intermittently bonded optical fiber tape core wire return to the state of manufacturing when taken out from the cable core for connection, twisting of the single-core covered optical fibers is eliminated, and thus the workability during connection is secured.

According to the second aspect of the present invention, the plurality of intermittently bonded optical fiber tape core wires is assembled into the cable core while the plurality of intermittently bonded optical fiber tape core wires are aligned so that the lined-up orientations of the core wires are different from each other. Thus, an external force is applied to the intermittently bonded optical fiber tape core wire from other intermittently bonded optical fiber tape core wires, in a direction that does not coincide with the long side direction. As a result, a change in a difference in the core wire twisting directions of the single-core covered optical fibers is likely to occur, so that it is easy to generate the twisting of the single-core covered optical fibers.

According to the third aspect of the present invention, the plurality of intermittently bonded optical fiber tape core wires is assembled into the cable core while the plurality of intermittently bonded optical fiber tape core wires are aligned so that the lined-up orientations of the core wires are different from each other. Thus, an external force is applied to the intermittently bonded optical fiber tape core wire from other intermittently bonded optical fiber tape core wires, in a direction that does not coincide with the long side direction. As a result, a change in a difference in the core wire twisting directions of the single-core covered optical fibers is likely to occur, so that it is easy to generate the twisting of the single-core covered optical fibers. Accordingly, the optical fiber cable in which twisting has occurred in the single-core covered optical fibers of the intermittently bonded optical fiber tape core wire is easily manufactured.

According to the fourth aspect of the present invention, the intermittently bonded optical fiber tape core wire fed out in a flat state from the core wire teed-out section is deformed into a concave shape by the deformation imparting section, and is assembled into the cable core by the core wire assembling section while maintaining the deformation. As a result, the optical fiber cable in which twisting has occurred in the single-core covered optical fibers of the intermittently bonded optical fiber tape core wire is manufactured.

According to the fifth aspect of the present invention, the intermittently bonded optical fiber tape core wire fed out in a flat state is deformed into a concave shape and assembled into the cable core while maintaining the deformation. As a result, the optical fiber cable in which twisting has occurred in the single-core covered optical fibers of the intermittently bonded optical fiber tape core wire is manufactured.

DESCRIPTION OF EMBODIMENTS

First Embodiment

Figure 1:
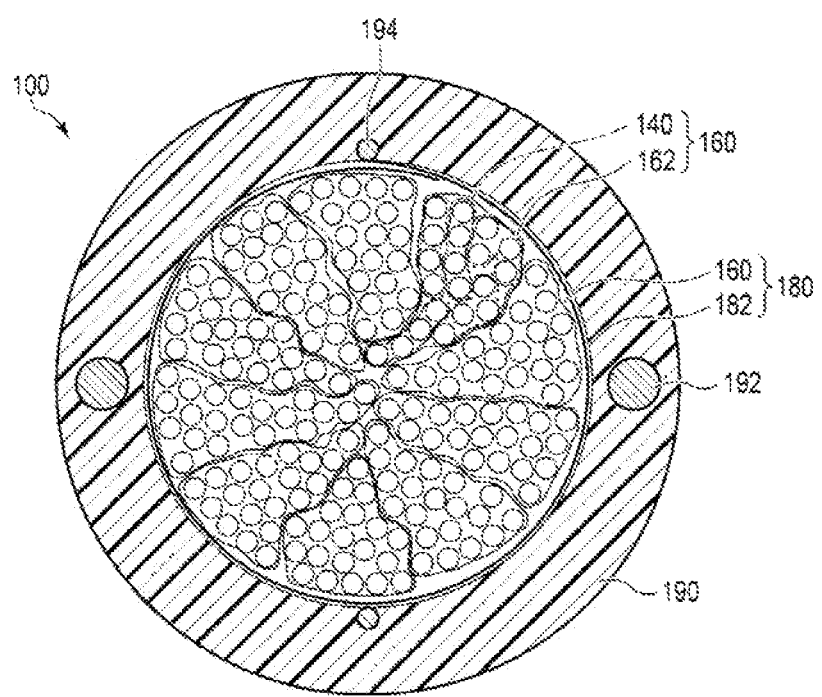
FIG. 1 is a cross-sectional view of an optical fiber cable according to a first embodiment.

Hereinafter, embodiments of the present invention will be described with reference to drawings. FIG. 1 is a cross-sectional view of an optical fiber cable 100 according to the present embodiment.

The optical fiber cable 100 is configured by assembling intermittent tape core wires 140 (intermittently bonded optical fiber tape core wires) each including a plurality of multi-core optical fibers having a plurality of cores into a cable core 180, and applying a jacket 190. The intermittent tape core wire 140 is described below. The configuration of the optical fiber cable 100 described here is not limited to the present embodiment, and is the same in other embodiments described below.

In other words, the optical fiber cable 100 is constituted of a cable core 180 and a jacket 190. The jacket 190 is a cylindrical member and the cable core 180 extends longitudinally within the inner space of the jacket 190. The jacket 190 covers the outer perimeter of the cable core 180 and serves to protect the cable core 180.

The cable core 180 is constituted of a plurality of core wire units 160 and a press winding member 182. The plurality of core wire units 160 is bundled together by the press winding member 182 wound around them so as to be substantially circular in the cable cross-section. Here, the cable cross-section refers to a cross-section substantially perpendicular to the longitudinal direction of the optical fiber cable 100.

Two tensile members 192 and two rip cords 194 are embedded in the jacket 190. Both the tensile members 192 and the rip cords 194 extend in the longitudinal direction of the jacket 190. The two tensile members 192 and the two rip cords 194 are each disposed in a central symmetry in the cable cross-section. The tensile members 192 and the rip cords 194 are disposed at 90 degree angular intervals. The tensile members 192 function to suppress the expansion and contraction and change in temperature of the jacket 190 due to pulling. The rip cords 194 are provided to facilitate ripping of the jacket 190.

Each of the core wire units 160 is constituted of a plurality of intermittent tape core wires 140 and a press winding member 162. The plurality of intermittent tape core wires 140 is bundled together by a press winding member 162 wound around them.

Figure 2:
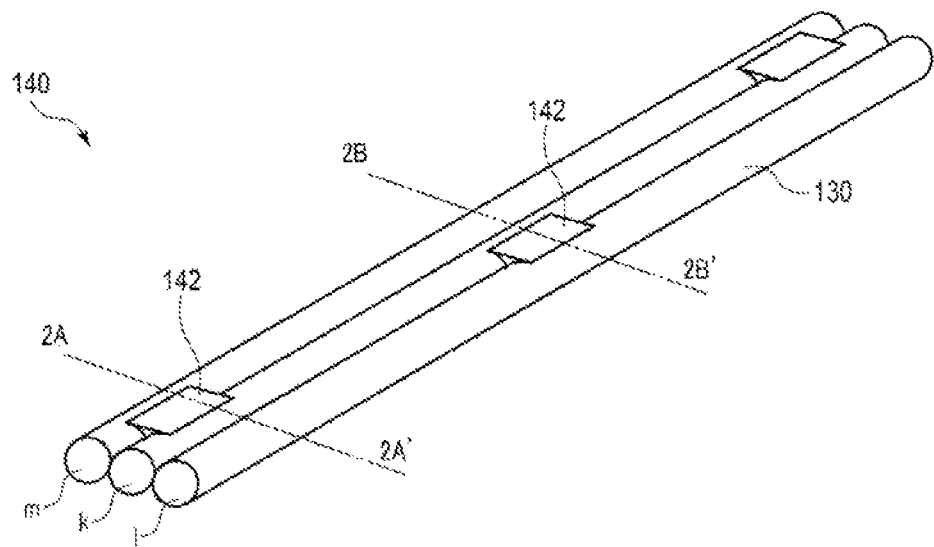
FIG. 2 is a perspective view of an intermittent tape core wire according to the first embodiment in a state before being assembled into a cable core.
Figure 2A:
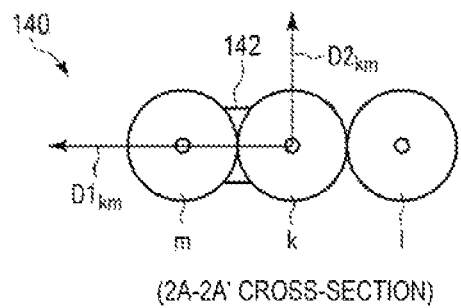
FIG. 2A is a cross-sectional view of the intermittent ape core wire taken along the line 2A-2A' in FIG. 2.
Figure 2B:
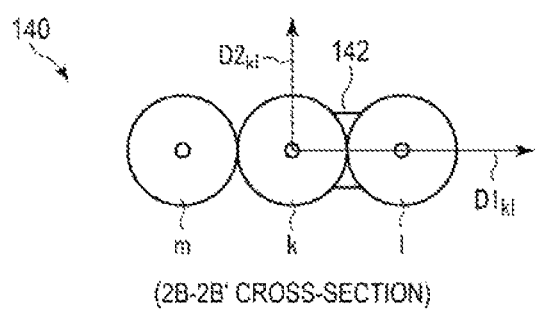
FIG. 2B is a cross-sectional view of the intermittent tape core wire taken along the line 2B-2B' in FIG. 2.

Next, the intermittent tape core wire 140 will be described. FIG. 2 is a perspective view of an intermittent tape core wire 140 in a state before being assembled into the cable core 180. FIG. 2A is a cross-sectional view of the intermittent tape core wire 140 taken along the line 2A-2A' in FIG. 2. FIG. 2B is a cross-sectional view of the intermittent tape core wire 140 taken along the line 2B-2B' in FIG. 2.

The intermittent tape core wire 140 is configured by disposing bonding portions 142 at a plurality of locations two dimensionally in a longitudinal direction and in a width direction, the bonding portions 142 being for bonding two adjacent cores of three or more single-core covered optical fibers 130 that are multi-core optical fibers having a plurality of cores subjected to application of a cover on the outer periphery. In other words, the intermittent tape core wire 140 is constituted of three or more single-core covered optical fibers 130 and the plurality of bonding portions 142 intermittently connecting the two adjacent single-core covered optical fibers 130, and each of the single-core covered optical fibers 130 is constituted of a multi-core optical fiber having a plurality of cores.

As illustrated in FIG. 2, the intermittent tape core wire 140 in a state before being assembled into the cable core 180 is in a state of manufacturing and is in a flat state. Here, the flat state refers to a state in which the central axes of all of the single-core covered optical fibers 130 included in the intermittent tape core wire 140 is located on one plane in a state when the intermittent tape core wire 140 are extended straight.

In FIG. 2, for convenience, only three single-core covered optical fibers 130 continuously adjacent in the width direction are depicted. In the following, with respect to these three single-core covered optical fibers 130, a single-core covered optical fiber 130 located in the center is referred to as a k core wire, and single-core covered optical fibers 130 located on both sides of the k core wire are referred to as an l core wire and an m core wire, respectively. For convenience, each of the single-core covered optical fibers 130 is also simply referred to as a core wire.

The bonding portion 142 connecting the k core wire and the l core wire and the bonding portion 142 connecting the k core wire and the m core wire are disposed at different positions in the longitudinal direction and the width direction of the intermittent tape core wire 140. For example, the bonding portion 142 connecting the k core wire and the l core wire is disposed at an intermediate position of the two bonding portions 142 connecting the k core wire and the m core wire with respect to the longitudinal direction of the intermittent tape core wire 140.

Here, a core wire twisting direction of the k core wire at the bonding portion 142 is defined as follows. Further, a bonding portion direction of the bonding portion 142 is defined as follows in order to define the core wire twisting direction.

With respect to the bonding portion 142 connecting the k core wire and the m core wire, as illustrated in FIG. 2A, the direction from the center of the k core wire toward the center of the m core wire in the cross-section of the optical fibers is the bonding portion direction $D1_{km}$. A direction in which the bonding portion direction $D2_{km}$ is rotated to the right by 90°, i.e., rotated by −90° is the core wire twisting direction $D2_{km}$ of the k core wire at the bonding portion 142. Here, the cross-section of the optical fibers refers to a cross-section substantially perpendicular to a longitudinal direction of the core wire (for example the k core wire). Although the longitudinal directions of the core wires may not be exactly aligned, the difference may be negligible, and the cross-section of the optical fibers may be considered as a cross-section perpendicular to the longitudinal direction of any of the core wires.

With respect to the bonding portion 142 connecting the k core wire and the l core wire, as illustrated in FIG. 2B, the direction from the center of the k core wire toward the center of the k core wire in the cross-section of the optical fibers is the bonding portion direction $D1_{kl}$. A direction in which the bonding portion direction $D1_{kl}$ is rotated to the left by 90°, i.e., rotated by +90° is the core wire twisting direction $D2_{kl}$ of the k core wire at the bonding portion 142.

Here, the direction perpendicular to the bonding portion directions $D1_{km}$ and $D1_{kl}$ are defined as the core wire twisting directions $D2_{km}$ and $D2_{kl}$, but instead, a specific direction common to the bonding portion directions $D1_{km}$ and $D1_{kl}$ may be defined as the core wire twisting directions $D2_{km}$ and $D2_{kl}$.

As can be seen in FIGS. 2A and 2B, the intermittent tape core wire 140 is in a state before being assembled into the cable core 180, in other words, in a state of manufacturing the intermittent tape core wire 140, and in a flat state, the core wire twisting direction $D2_{km}$ of the k core wire at the bonding portion 142 connecting the k core wire and the m core wire and the core wire twisting direction $D2_{kl}$ of the k core wire at the bonding portion 142 connecting the k core wire and the l core wire are aligned. In other words, θ=0 is satisfied, where θ is the difference between the core wire twisting direction $D2_{km}$ and the core wire twisting direction $D2_{kl}$.

In the optical fiber cable 100 according to the present embodiment, the intermittent tape core wire 140 is assemble into the cable core 180 in a state described below, Here, the state is such that the difference between the core wire twisting direction $D2_{km}$ of the k core wire at the bonding portion 142 connecting the k core wire and the m core wire and the core wire twisting direction $D2_{kl}$ of the k core wire at the bonding portion 142 connecting the k core wire and the l core wire is different from the that before being assembled into the cable core 180, that is, when manufacturing the intermittent tape core wire 140.

Figure 3:
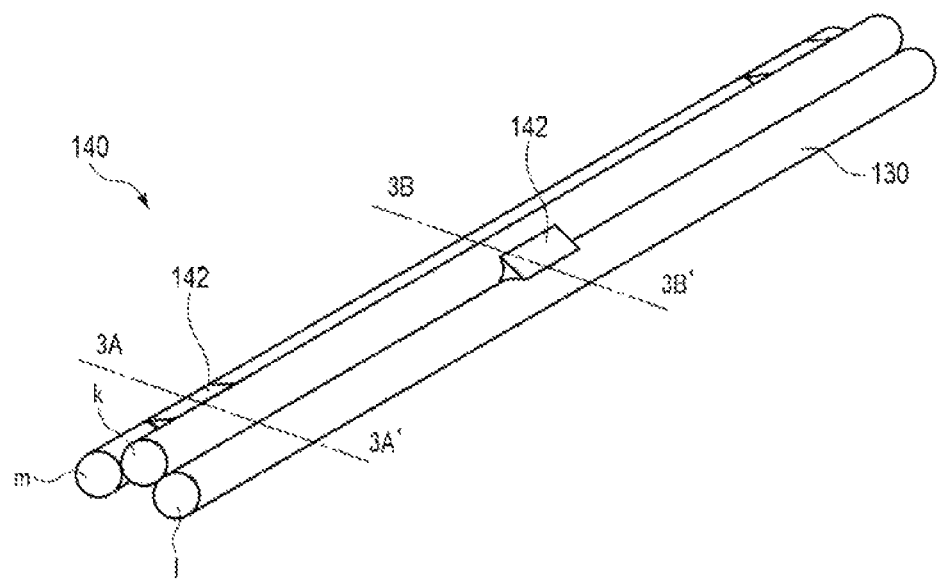
FIG. 3 is a perspective view of the intermittent tape core wire according to the first embodiment in a state after being assembled into the cable core.
Figure 3A:
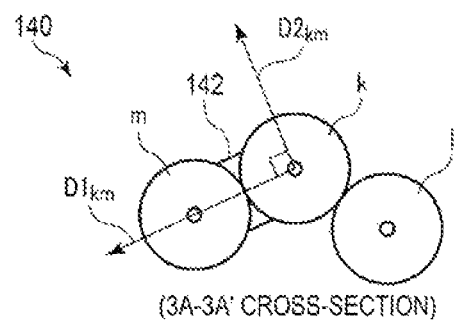
FIG. 3A is a cross-sectional view of the intermittent tape core wire taken along the line 3A-3A' in FIG. 3.
Figure 3B:
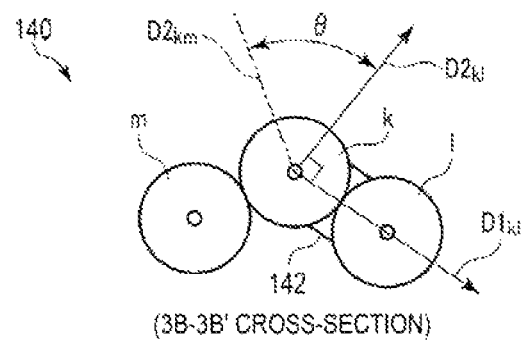
FIG. 3B is a cross-sectional view of the intermittent tape core wire taken along the line 3B-3B' in FIG. 3.

FIG. 3 is a perspective view of the intermittent tape core wire 140 in a state after being assembled into the cable core 180. FIG. 3A is a cross-sectional view of the intermittent tape core wire 140 taken along the line 3A-3A' in FIG. 3. FIG. 3B is a cross-sectional view of the intermittent tape core wire 140 taken along the line 3B-3B' in FIG. 3.

A change in angle formed between the core wire twisting direction $D2_{km}$ and the core wire twisting direction $D2_{kl}$ occurs when the intermittent tape core wire 140 receives external forces from another intermittent tape core wire 140 when the intermittent tape core wires 140 are assembled into the cable core 180.

As can be seen in FIGS. 3A and 3B, in the state after being assembled into the cable core 180, compared to the state before being assembled, the core wire twisting direction $D2_{km}$ of the k core wire at the bonding portion 142 connecting the k core wire and the m core wire and the core wire twisting direction $D2_{kl}$ of the k core wire at the bonding portion 142 connecting the k core wire and the l core wire are different from each other. In other words, the difference θ between the core wire twisting direction $D2_{km}$ and the core wire twisting direction $D2_{kl}$ is a value different from 0, which is the value before being assembled into the cable core 180, in other words, when manufacturing the intermittent tape core wire 140. In other words, θ≠0. In other words, the value of the difference θ varies before and after being assembled into the cable core 180.

The k core wire is restrained at the respective bonding portions 142 with the l core wire and the m core wire. By assembling the intermittent tape core wire 140 into the cable core 180, twisting occurs in the k core wire. As a result, the difference between the core wire twisting direction $D2_{km}$ and the core wire twisting direction $D2_{kl}$ of the k core wire of the intermittent tape core wire 140 is different from the directions at the time before being assembled into the cable core 180, that is, when the intermittent tape core wire 140 is manufactured.

At this time, the designer can design the twisting speed as θ/b, where the difference between the core wire twisting direction $D2_{km}$ and the core wire twisting direction $D2_{kl}$ is θ and a section Where the bonding portion 142 is not present in the longitudinal direction of the intermittent tape core wire 140 is b. From the perspective of reliability of the intermittent tape core wire 140, there is an upper limit on the twisting speed to be imparted. Here, since there are no other core wires between adjacent core wires, the upper limit of θ is 2π/3. The designer can set the upper limit of the twisting speed by designing the b according to the relationship $\lambda_{max}=2/\pi 3b$, where the upper limit of the twisting speed is $\lambda_{max}$.

Furthermore, in the multi-core optical fiber, the relationship between the core interval and the twisting speed for sufficiently generating the coupling between transmission lines is apparent, and appropriate twisting may be applied in accordance with the design of the core interval of the optical fiber (Patent Literature 1). The designer can also design this twisting speed based on the previous formula, for example if it is desired to apply the twisting speed of 0.5πrad/m, b may be set to b=1.33 m.

Note that when connecting the intermittent tape core wire 140, the intermittent tape core wire 140 is restored to the arrangement state at the time of manufacturing by being taking out from the cable core 180. Thus, even with the twisting when assemble into the cable core 180, the twisting is eliminated when connected, and the workability during connection does not decline.

Second Embodiment

The second embodiment relates to a design of a mounting density of core wires of the optical fiber cable 100 according to the first embodiment. If the mounting density of the core wires is small, there is a concern that the force that maintains the twisting of the single-core covered optical fiber 130 of the intermittent tape core wire 140 is insufficient. The present embodiment shows the design of the proper mounting density that maintains the twisting of the single-core covered optical fiber 130 of the intermittent tape core wire 140.

Figure 4:
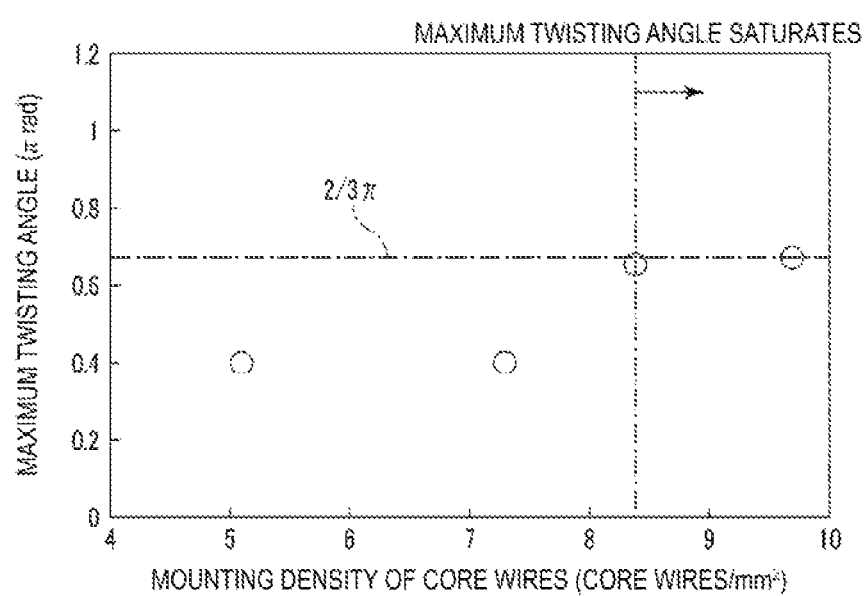
FIG. 4 is a graph illustrating the maximum twisting angle of intermittent tape core wire with respect to mounting density of core wires according to a second embodiment.

FIG. 4 is a graph illustrating the maximum twisting angle of the single-core covered optical fiber 130 of the intermittent tape core wire 140 with respect to mounting density of the core wires. As can be seen from the graph in FIG. 4, it can be seen that when the mounting density of the core wires is greater than or equal to 8.4 core wires/mm², the maximum twisting angle of the single-core covered optical fiber 130 of the intermittent tape core wire 140 is 2π/3.

In other words, in the optical fiber cable 100 according to the present embodiment, the mounting density of the core wires is greater than or equal to 8.4 core wires/mm². As a result, the twisting angle of the 2π/3 of the single-core covered optical fiber 130 of the intermittent tape core wire 140 is obtained.

Third Embodiment

In the optical fiber cable 100 according to the first embodiment and the second embodiment, before and after assembling the intermittent tape core wire 140 into the cable core 180, in order for a change in the angular difference between the core wire twisting direction $D2_{km}$ and the core wire twisting direction $D2_{kl}$, when the intermittent tape core wire 140 is assembled into the cable core 180, it is necessary for the intermittent tape core wire 140 to receive an external force in a direction that does not coincide with the width direction of the intermittent tape core wire 140, that is, the alignment orientation of the core wires. However, since the intermittent tape core wire 140 has a wide structure in the alignment orientation of the core wires, the intermittent tape core wire 140 is susceptible to external forces coinciding with width direction in which the core wires are aligned. As a result, there is a concern that a change in the difference between the core wire twisting direction $D2_{km}$ and the core wire twisting direction $D2_{kl}$, so that the twisting does not occur in the k core wire.

Figure 5A:
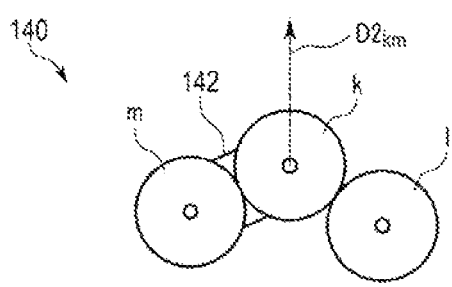
FIG. 5A is a cross-sectional view of an intermittent tape core wire according to a third embodiment in a state before being assembled into the cable core.
Figure 5B:
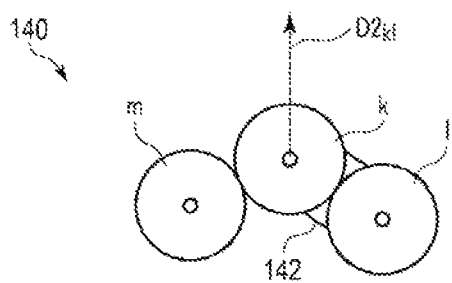
FIG. 5B is a cross-sectional view of the intermittent tape core wire according to the third embodiment in a state before being assembled into the cable core.
Figure 6A:
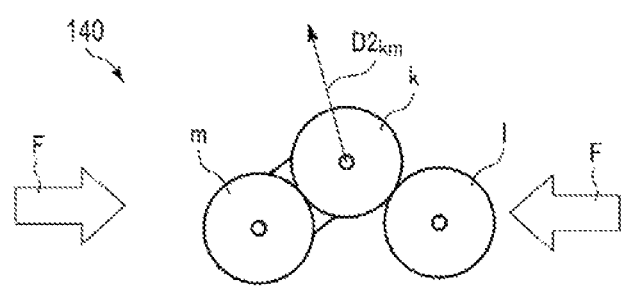
FIG. 6A is a cross-sectional view of the intermittent tape core wire according to the third embodiment in a state after being assembled into the cable core.
Figure 6B:
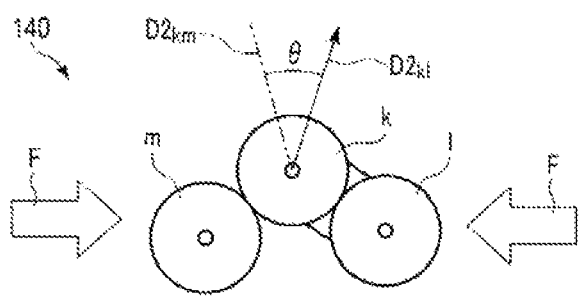
FIG. 6B is a perspective view of the intermittent tape core wire according to the third embodiment in a state after being assembled into the cable core.

The present embodiment relates to a structure of the intermittent tape core wire 140, Which is susceptible to cause a thread in the single-core covered optical fiber 130. The intermittent tape core wire 140 according to the present embodiment can be replaced with the intermittent tape core wire 140 of the optical fiber cable 100 according to the first embodiment and the second embodiment. FIGS. 5A, 5B, 6A, and 6B are cross-sectional views of the intermittent tape core wire 140 according to the present embodiment. FIGS. 5A and 5B are cross-sectional views of the intermittent tape core wire 140 in a state before being assembled into the cable core 180. FIGS. 6A and 6B are cross-sectional views of the intermittent tape core wire 140 in a state after being assembled into the cable core 180. FIGS. 5A and 6A are cross-sectional views through the bonding portion 142 connecting the k core wire and the in core wire. FIGS. 5B and 6B are cross-sectional views through the bonding portion 142 connecting the k core wire and the l core wire.

As illustrated in FIGS. 5A and 5B, the intermittent tape core wire 140 according to the present embodiment has a structure in which the center of k core wire is not located on a straight line connecting the center of the l core wire and the center of the m core wire in the cross-section of the optical fibers in a state before being assembled into the cable core 180, that is, when manufacturing the intermittent tape core wire 140. In other words, in the structure, the center of the three core wires adjacent each other are not aligned on a single straight line in the cross-section of the optical fibers.

Due to such a structure, in the intermittent tape core wire 140 according to the present embodiment, the change in the angular difference between the core wire twisting direction $D2_{km}$ and the core wire twisting direction $D2_{kl}$ tends to occur, as illustrated in FIGS. 6A and 6B, when assembled into the cable core 180, the direction of the external force F from the other intermittent tape core wire 140 is even from the width direction of the intermittent tape core wire 140, that is, from the alignment orientation of the l core wire and the m core wire, and this causes the k core wire to be easily twisted.

Intermittent Tape Core Wire 140 of Four or More Core Wires

In a case where the intermittent tape core wire 140 has four or more core wires, with attention to a certain three core wires continuously adjacent, it is possible to select that the center of the k core wire is located on which side of a straight line connecting the center of the l core wire and the center of the m core wire.

Figure 7A:
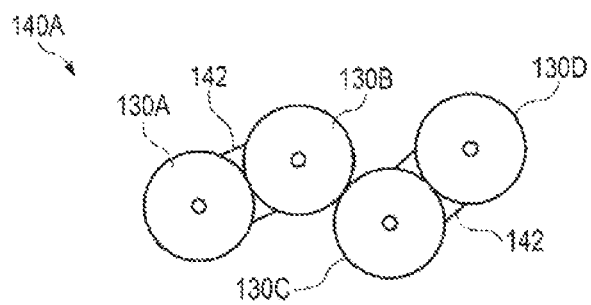
FIG. 7A is a cross-sectional view of the intermittent tape core wire of four core wires according to the third embodiment.
Figure 7B:
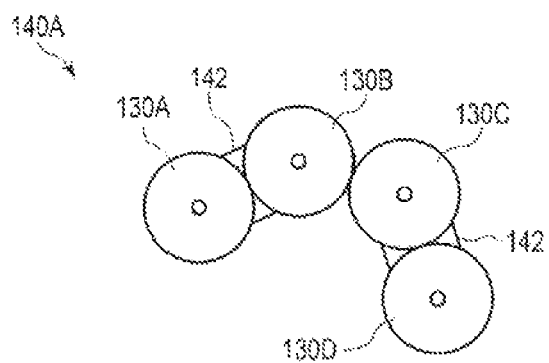
FIG. 7B is a cross-sectional view of the intermittent tape core wire of four core wires according to the third embodiment.

FIG. 7A is a cross-sectional view of the intermittent tape core wire 140A of four core wires according to the present embodiment. FIG. 7B is a cross-sectional view of the intermittent tape core wire 140A of four core wires according to the present embodiment. FIGS. 7A and 7B both illustrate cross-sections in a state before being assembled into a cable core 180.

The intermittent tape core wire 140A has four single-core covered optical fibers 130A, 130B, 130C, and 130D. Each of the single-core covered optical fibers 130A, 130B, 130C, and 130D is constituted of a multi-core optical fiber having a plurality of cores. The intermittent tape core wire 140A also includes two sets of three single-core covered optical fibers 130A, 130B, 130C, and 130D continuously adjacent in the width direction. In other words, the intermittent tape core wire 140A includes a first set of three single-core covered optical fibers 130A, 130B, 130C, and a second set of three single-core covered optical fibers 130B, 130C, 130D.

In the first set of three single-core covered optical fibers 130A, 130B, and 130C, the single-core covered optical fibers 130A, 130B, and 130C correspond to the m core wire, the k core wire, and the l core wire, respectively. In the second set of three single-core covered optical fibers 130B, 130C, and 130D, the single-core covered optical fibers 130B, 130C, and 130D correspond to the m core wire, the k core wire, and the l core wire, respectively. In any of these two sets of three core wires, the center of the k core wire is not located on a straight line connecting the center of the l core wire and the center of the m core wire in the cross-section of the optical fibers.

In the intermittent tape core wire 140A illustrated in FIG. 7A, in the cross-section of the optical fibers, the center of the single-core covered optical fiber 130B is located on the upper side with respect to a straight line connecting the centers of the single-core covered optical fibers 130A and 130C, and on the contrary the center of the single-core covered optical fiber 130C is located on the lower side with respect to a straight line connecting the centers of the single-core covered optical fibers 130B and 130D. Since the single-core covered optical fibers 130A, 130B, 130C, and 130D are generally aligned on a straight line, such intermittent tape core wire 140A has the advantage that connection is easily performed.

In the intermittent tape core wire 140A illustrated in FIG. 7B, in the cross-section of the optical fibers, the center of the single-core covered optical fiber 130B is located on the upper side with respect to a straight line connecting the centers of the single-core covered optical fibers 130A and 130C, and similarly the center of the single-core covered optical fiber 130C is also located on the upper side with respect to a straight line connecting the centers of the single-core covered optical fibers 130B and 130D. Since the alignment of the single-core covered optical fibers 130A, 130B, 130C, and 130D has a warped shape, such intermittent tape core wire 140A has the advantage that the twisting of the single-core covered optical fibers 130A, 130B, 130C, and 130D is more likely to occur.

In addition, in the intermittent tape core wire 140 including more core wires, it is in the scope of assumed design to combine the sides on which the center of k core wire is located with respect to a straight line connecting the center of the l core wire and the center of the m core wire. In other words, it is included in the disclosure of the present embodiment to freely combine the arrangement of the core wires in FIG. 7A and the arrangement of the core wires in FIG. 7B to configure the intermittent tape core wire 140 of five or more core wires.

Fourth Embodiment

In the optical fiber cable 100 according to the first to third embodiments, since the core wires located at ends in the width direction of the intermittent tape core wire 140 have longer sections where the bonding portion 142 does not present in the longitudinal direction of the intermittent tape core wire 140 compared to the other core wires located on the inner side, they have a tendency for a change in the difference in the core wire twisting direction to be less likely to occur.

Figure 8:
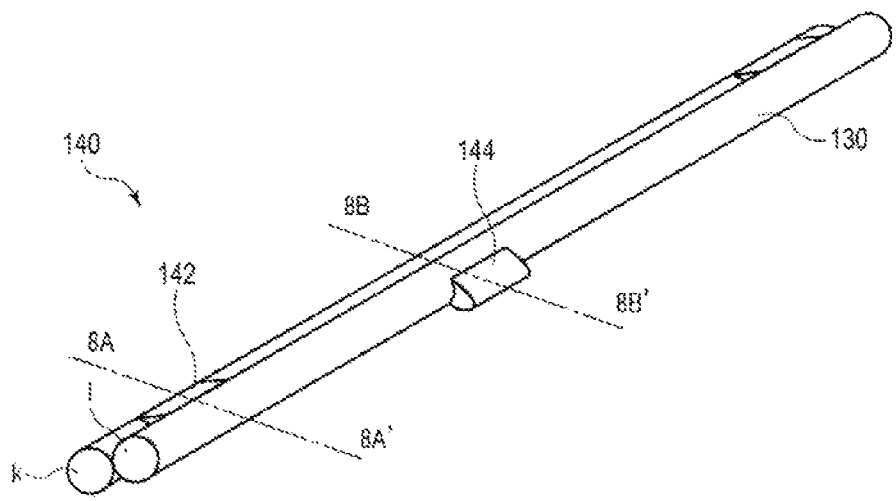
FIG. 8 is a perspective view of an intermittent tape core wire according to a fourth embodiment.

The present embodiment relates to a structure in which the change in the angular difference of the core wire twisting direction tends to occur in the core wires located at the ends in the width direction of the intermittent tape core wire 140. The intermittent tape core wire 140 according to the present embodiment can be replaced with the intermittent tape core wire 140 of the optical fiber cable 100 according to the first to third embodiments. FIG. 8 is a perspective view of an intermittent tape core wire 140 according to the present embodiment. FIG. 8 illustrates the intermittent tape core wire 140 in a state after being assembled into the cable core 180. FIG. 9A is a cross-sectional view of the intermittent tape core wire taken along the line 8A-8A' in FIG. 8. FIG. 8B is a cross-sectional view of the intermittent tape core wire taken along the line 8B-8B' in FIG. 8.

In FIG. 8, for convenience, only the k core wire and the l core wire are depicted as two single-core covered optical fibers 130 located at the end in the width direction of the intermittent tape core wire 140. The l core wire is a core wire located at an end in the width direction of the intermittent tape core wire 140. The intermittent tape core wire 140 includes a protruding portion 144 provided on the l core wire. The protruding portion 144 is disposed at a position different from the position of the bonding portion 142 connecting the k core wire and the l core wire with respect to the longitudinal direction of the intermittent tape core wire 140. The protruding portion 144 has a substantially triangular prism shape, for example. The protruding portion 144 protrudes in the width direction of the intermittent tape core wire 140, for example.

Although only one protruding portion 144 is depicted in FIG. 8, a plurality of protruding portions 144 is provided on the l core wire at a distance in the longitudinal direction of the l core wire. For example, each of the protruding portions 144 is located between the bonding portions 142 connecting the k core wire and the l core wire with respect to the longitudinal direction of the intermittent tape core wire 140.

Here, although not illustrated, in the intermittent tape core wire 140 in a state before being assembled into the cable core 180, that is, when manufacturing the intermittent tape core wire 140, the projection direction D3 of the protruding portion 144 and the core wire twisting direction $D2_{lp}$ of the l core wire in the protruding portion 144 are defined as follows.

In the cross-section of the optical fibers, a direction extending from the center of the l core wire across the protruding portion 144 is referred to as a projection direction D3 of the protruding portion 144. For example, when the protruding portion 144 has a tip, the projection direction D3 of the protruding portion 144 may be a direction from the center of the l core wire toward the tip of the protruding portion 144. In addition, the core wire twisting direction $D2_{lp}$ of the l core wire at the protruding portion 144 is a direction parallel to the core wire twisting direction $D2_{lk}$ of the l core wire at the bonding portion 142 connecting the l core wire and the k core wire.

For example, the projection direction D3 of the protruding portion 144 is located on a straight line connecting the center of the l core wire and the center of the k core wire. In this case, the core wire twisting direction $D2_{lp}$ of the l core wire at the protruding portion 144 is perpendicular to the projection direction D3 of the protruding portion 144.

In the optical fiber cable 100 according to the present embodiment, the intermittent tape core wire 140 is assemble into the cable core 180 so that the projection direction D3 of the protruding portion 144 with respect to the straight line connecting the center of the l core wire and the center of the k core wire is different from the time before being assembled into the cable core 180, that is, when manufacturing the intermittent tape core wire 140.

When the intermittent tape core wire 140 is assembled into the cable core 180, it receives external forces from other intermittent tape core wire 140 and the like. At this time, as illustrated in FIG. 8B, the protruding portion 144 is moved so as to be pressed away by receiving an external force from an n core wire of another intermittent tape core wire 140. Consequently, the projection direction D3 of the protruding portion 144 changes from the direction indicated by the two-dot chain arrow to the direction indicated by the solid line. Such movement of the protruding portion 144 causes the l core wire to rotate clockwise or counterclockwise. As a result, a change in the difference θ of the core wire twisting direction of the l core wire occurs. Thus, a twisting occurs in the l core wire.

Figure 8A:
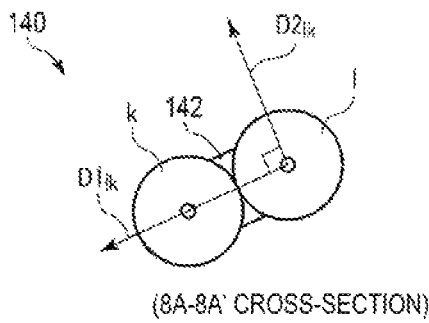
FIG. 8A is a cross-sectional view of the intermittent tape core wire taken along the line 8A-8A' in FIG. 8.
Figure 8B:
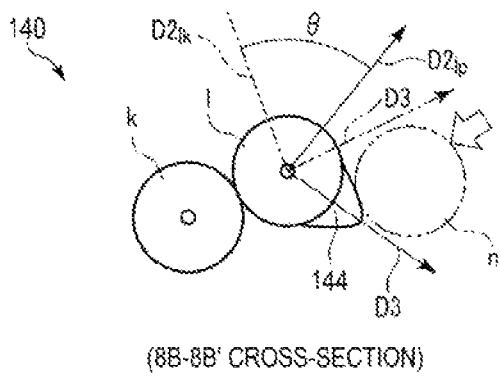
FIG. 8B is a cross-sectional view of the intermittent tape core wire taken along the line 8B-8B' in FIG. 8.

As can be seen by comparing FIGS. 8A and 8B, in the state after being assembled into the cable core 180, compared to the state before being assembled, the core wire twisting direction $D2_{lk}$ of the l core wire at the bonding portion 142 connecting the k core wire and the l core wire and the core wire twisting direction $D2_{lp}$ of the l core wire at the protruding portion 144 connecting the k core wire and the l core wire are different. In other words, before and after assembling the intermittent tape core wire 140 into the cable core 180, a change in the difference θ between the core wire twisting direction $D2_{lk}$ and the core wire twisting direction $D2_{lp}$ occurs.

Note that it is within the scope of the design to make the protruding portions 144 have a sharp cross-sectional shape or a hook shape cross-sectional shape to contact with a single-core covered optical fiber 130 of adjacent other intermittent tape core wire 140 so that a change in the core wire twisting direction of the l core wire tends to occur when the protruding portions 144 are pushed away.

Fifth Embodiment

Figure 9:
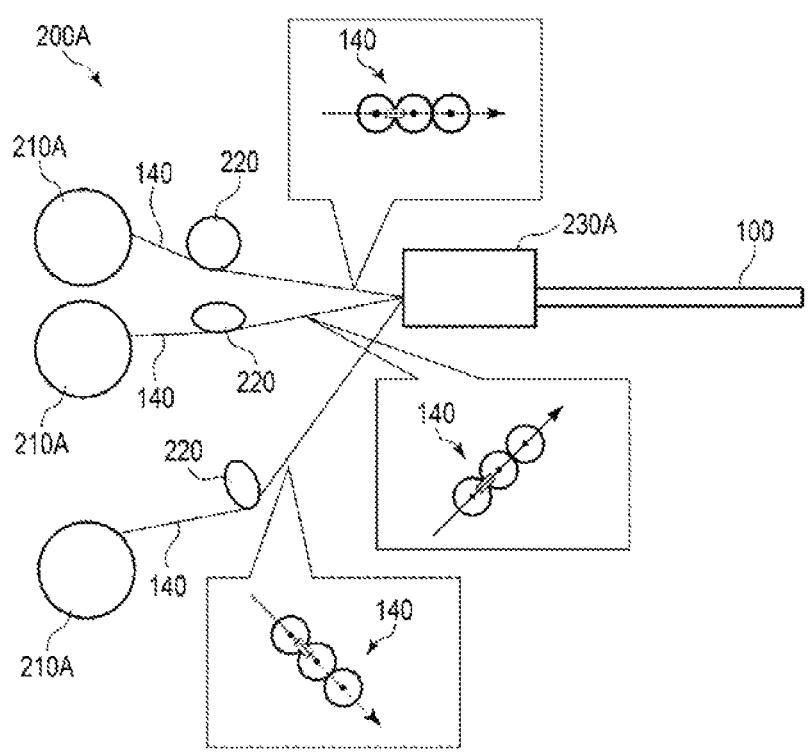
FIG. 9 is a configuration diagram of a device for manufacturing an optical fiber cable according to a fifth embodiment.

The fifth embodiment relates to manufacturing of an optical fiber cable. FIG. 9 is a configuration diagram of a device for manufacturing an optical fiber cable according to the present embodiment.

The device 200A for manufacturing the optical fiber cable includes a plurality of core wire feed-out sections 210A configured to feed out a plurality of intermittent tape core wires 140 respectively, a plurality of alignment orientation control sections 220 configured to control alignment orientations of the plurality of the intermittent tape core wires 140, respectively, and a core wire assembling section 230A configured to assemble the plurality of the intermittent tape core wires 140 into a cable core.

In FIG. 9, three core wire feed-out sections 210A and three alignment orientation control sections 220 are depicted, but this is merely exemplary, and the number of the core wire feed-out sections 210A and the alignment orientation control sections 220 is not limited these.

Each of the core wire feed-out sections 210A is constituted of, for example, an optical fiber bobbin or the like. Each of the core wire feed-out sections 210A feeds out the intermittent tape core wire 140 to the alignment orientation control section 220 in a state of manufacturing or a flat state. Each of the intermittent tape core wire 140 includes a plurality of single-core covered optical fibers 130, and each of the single-core covered optical fibers 130 is constituted of a multi-core optical fiber having a plurality of cores.

Each of the alignment orientation control sections 220 is constituted of a rotatable wheel, for example. Each of the alignment orientation control sections 220 is capable of adjusting the inclination of each of the intermittent tape core wire 140 by changing the inclination of the rotation shaft of the wheel. The plurality of alignment orientation control sections 220 adjusts the alignment orientations of the respective plurality of intermittent tape core wires 140 so that the lined-up orientations of the core wires of the plurality of intermittent tape core wires 140 fed out from the plurality of core wire feed-out sections 210A are different from each other. In FIG. 9, the lined-up orientations of the core wires of the intermittent tape core wire 140 are indicated by arrows.

The core wire assembling section 230A assembles the plurality of intermittent tape core wires 140 fed from the alignment orientation control sections 220 into the cable core 180 while maintaining the lined-up orientations of their core wires. The core wire assembling section 230A further applies the jacket 190 to the cable core 180. As a result, the optical fiber cable 100 is manufactured.

In the device 200A for manufacturing the optical fiber cable having such a configuration, the twisting of the single-core covered optical fibers 130 of the intermittent tape core wire 140 can be facilitated. This is due to the following reason. Since the intermittent tape core wire 140 has a wide cross-sectional shape, it is easy to apply an external force in the long side direction of the cross-section to another intermittent tape core wire 140 in the periphery. Thus, the external force in long side direction applies the external force in an orientation that does not coincide with the long side direction of the other intermittent tape core wire 140. As the result, a change in the difference between the core wire twisting direction $D2_{km}$ and the core wire twisting direction $D2_{kl}$ described in the first embodiment, for example, can easily occur. In other words, the twisting of the single-core covered optical fibers 130 of the intermittent tape core wire 140 can be facilitated.

Figure 10:
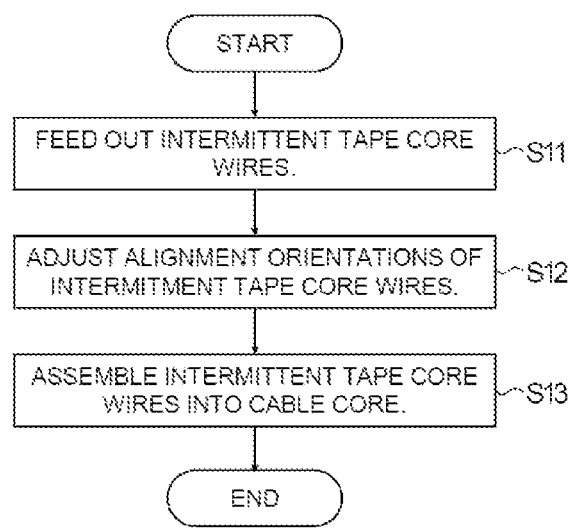
FIG. 10 is a flowchart of a method for manufacturing the optical fiber cable according to the fifth embodiment.

Next, production of the optical fiber cable 100 by the device 200A for manufacturing the optical fiber cable will be described. FIG. 10 is a flowchart of a method for manufacturing the optical fiber cable 100 according to the present embodiment.

In step S11, the plurality of intermittent tape core wires 140 are respectively fed out in a state of manufacturing or a flat state by the plurality of core wire feed-out sections 210A.

In step S12, the alignment orientations of the respective plurality of intermittent tape core wires 140 are adjusted by the plurality of alignment orientation control sections 220 so that the lined-up orientations of the core wires of the plurality of intermittent tape core wires 140 fed out from the plurality of core wire feed-out sections 210A are different from each other.

In step S13, the core wire assembling section 230A assembles the plurality of intermittent tape core wires 140 fed from the alignment orientation control sections 220 into the cable core 180 while maintaining the lined-up orientations of their core wires. The jacket 190 is applied to the cable core 180 to complete the optical fiber cable 100.

According to the present embodiment, the optical fiber cable 100 having the structure described in the first to fourth embodiments is easily manufactured.

Sixth Embodiment

Figure 11:
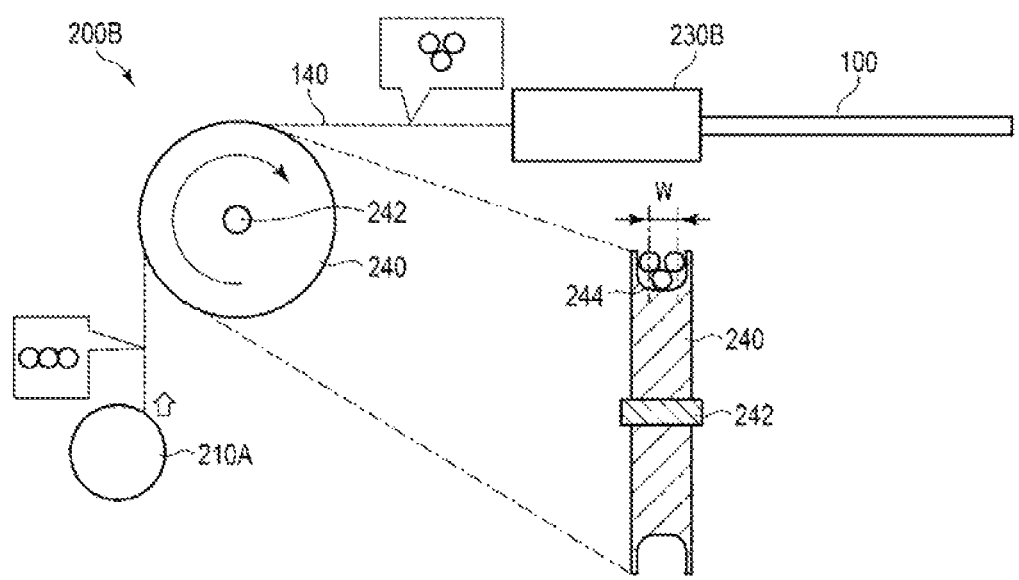
FIG. 11 is a configuration diagram of a device for manufacturing a tape core wire according to a sixth embodiment.

The sixth embodiment relates to manufacturing of an optical fiber cable. FIG. 11 is a configuration diagram of a device for manufacturing an optical fiber cable according to the present embodiment.

A device 200B for manufacturing the optical fiber cable includes a core wire feed-out section 210A configured to feed out an intermittent tape core wire 140, a deformation imparting section 240 configured to impart deformation to the fed out intermittent tape core wire 140, and a core wire assembling section 230B configured to assemble the intermittent tape core wire 140 into a cable core.

Similar to the fifth embodiment, the core wire feed-out section 210A is constituted of an optical fiber bobbin or the like. The core wire feed-out section 210A feeds out the intermittent tape core wire 140 in a state of manufacturing or a flat state. Each of the intermittent tape core wire 140 includes a plurality of single-core covered optical fibers 130, and each of the single-core covered optical fibers 130 is constituted of a multi-core optical fiber having a plurality of cores.

A deformation imparting section 240 is in the form of a roller and is rotatably supported around a shaft 242. The deformation imparting section 240 has a groove 244 configured to receive the intermittent tape core wire 140 on the periphery. The groove 244 has a concave cross-sectional shape in the radial direction. The width W of the bottom surface of the groove 244 is narrower than the width of the intermittent tape core wire 140, For example, the width W of the bottom surface of the groove 244 is less than or equal to (n−1)d, where n is the number of cores and d is the diameter of the single-core covered optical fibers 130 of the intermittent tape core wire 140.

The deformation imparting section 240 receives the intermittent tape core wire 140 fed out in a flat state from the core wire feed-out section 210A by the groove 244 provided in the periphery. Since the width W of the bottom surface of the groove 244 is narrower than the width of the intermittent tape core wire 140, the intermittent tape core wire 140 received in the groove 244 is deformed into a concave shape.

The core wire assembling section 230B assembles the intermittent tape core wire 140 fed from the deformation imparting section 240 into the cable core 180 while maintaining the concave deformation. The core wire assembling section 230B further applies the jacket 190 to the cable core 180. As a result, the optical fiber cable 100 is manufactured.

Figure 12:
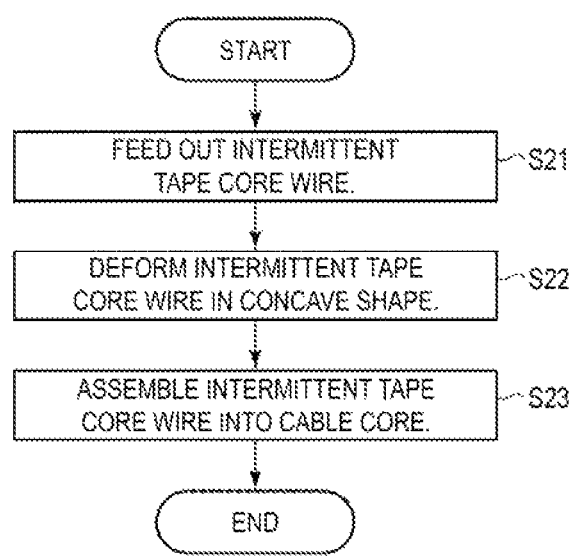
FIG. 12 is a flowchart of a method for manufacturing the tape core wire according to the sixth embodiment.

Next, production of the optical fiber cable 100 by the device 200B for manufacturing the optical fiber cable will be described. FIG. 12 is a flowchart of a method for manufacturing the optical fiber cable 100 according to the present embodiment.

In step S21, the intermittent tape core wire 140 is respectively fed out in a state of manufacturing or a flat state by the core wire feed-out sections 210A.

In step S22, by receiving the fed intermittent tape core wire 140 at the groove 244 of the deformation imparting section 240 having a concave cross-sectional shape, a concave deformation is imparted to the intermittent tape core wire 140.

In step S23, the fed intermittent tape core wire 140 is assembled into the cable core 180 while maintaining the concave deformation by the core wire assembling section 230B. The jacket 190 is applied to the cable core 180 to complete the optical fiber cable 100.

According to the present embodiment, the optical fiber cable 100 having the structure described in the first to fourth embodiments is manufactured.

Seventh Embodiment

Figure 13:
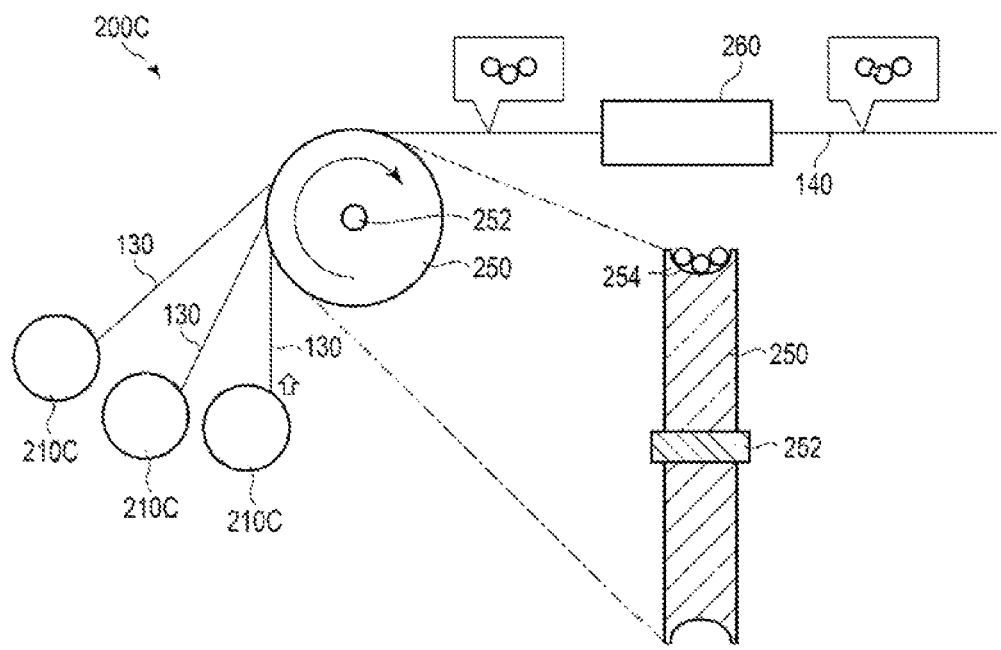
FIG. 13 is a configuration diagram of a device for manufacturing a tape core wire according to seventh embodiment.

The seventh embodiment relates to manufacturing of the intermittent tape core wire. FIG. 13 is a configuration diagram of a device for manufacturing the intermittent tape core wire according to the present embodiment.

The device 200C for manufacturing the intermittent tape core wire includes three single-core covered optical fiber feed-out sections 210C configured to feed out three single-core covered optical fibers 130, respectively, a core wire alignment section 250 configured to align the single-core covered optical fibers 130, and a core wire bonding section 260 configured to bond the aligned single-core covered optical fibers 130.

Each of the single-core covered optical fiber feed-out sections 210C is constituted of, for example, an optical fiber bobbin or the like. The single-core covered optical fiber 130 fed out by each of the single-core covered optical fiber feed-out sections 210C is constituted of a multi-core optical fiber including a plurality of cores. In order to stabilize the position of the single-core covered optical fiber 130 in contact with the core wire alignment section 250, each of the single-core covered optical fiber feed-out sections 210C is desirable that the attachment position and the angle be adjusted so that in a feed-out direction, a lateral pressure is applied in the normal direction of a point where each of the single-core covered optical fibers 130 comes into contact with the core wire alignment section 250.

The core wire alignment section 250 is in the form of a roller and is rotatably supported about a shaft 252. The core wire alignment section 250 has, on the periphery, a groove 254 configured to receive the three single-core covered optical fibers 130 fed out from the three single-core covered optical fiber feed-out sections 210C. A groove 254 has a concave cross-sectional shape in the radial direction. For example, the cross-sectional shape of the groove 254 is arc-shaped.

In the three single-core covered optical fiber feed-out sections 210C, the attachment position is preferably adjusted so that the single-core covered optical fiber 130 that first reaches the core wire alignment section 250 contacts with the center of the groove 254, and the subsequent two single-core covered optical fibers 130 contact with the groove 254 on both sides of the single-core covered optical fiber 130 in the center.

The core wire alignment section 250 receives the three single-core covered optical fibers 130 fed out from the single-core covered optical fiber feed-out sections 210C by the groove 254 provided in the periphery. Since the cross-sectional shape of the groove 254 is concave, the three single-core covered optical fibers 130 received in the groove 254 are aligned in a form in which the centers of the three single-core covered optical fibers 130 are not located on one straight line in the cross-section of the optical fibers. For example, the three single-core covered optical fibers 130 are aligned in a concave form as a whole.

The core wire bonding section 260 intermittently bonds two adjacent single-core covered optical fibers 130 while maintaining the alignment form of the three single-core covered optical fibers 130 fed from the core wire alignment section 250. As a result, the intermittent tape core wire 140 is manufactured.

Figure 14:
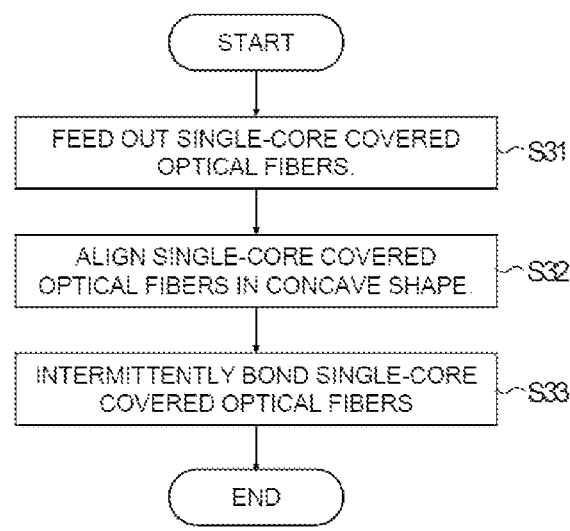
FIG. 14 is a flowchart of a method for manufacturing the tape core wire according to the seventh embodiment.

Next, the production of the intermittent tape core wire 140 by the device 200C for manufacturing the intermittent tape core wire will be described. FIG. 14 is a flowchart of a method for manufacturing the intermittent tape core wire 140 according to the present embodiment.

In step S31, the three single-core covered optical fibers 130 are respectively fed out by the three single-core covered optical fiber feed-out sections 210C.

In step S32, the three single-core covered optical fibers 130 are aligned in the concave form by receiving the fed three single-core covered optical fibers 130 in the groove 254 of the core wire alignment section 250 having a concave cross-sectional shape.

In step S33, the core wire bonding section 260 intermittently bonds two adjacent single-core covered optical fibers 130 while maintaining the alignment form of the fed three single-core covered optical fibers 130 to complete the intermittent tape core wire 140.

As described above, according to the present embodiment, the intermittent tape core wire 140 having the structure described in the third embodiment is manufactured.

The core wire alignment section 250 is in the form of a roller in order to reduce friction applied to the single-core covered optical fibers 130 in the present embodiment, but may also be in the form of a slit.

Figure 15A:
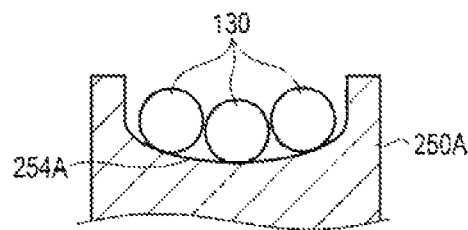
FIG. 15A is a cross-sectional view of another core wire alignment section that is substitutable for a core wire alignment section of FIG. 13.
Figure 15B:
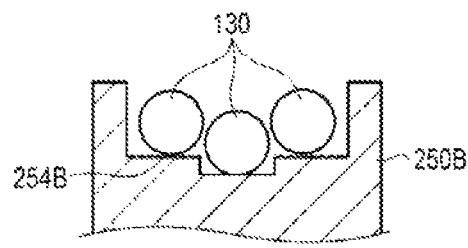
FIG. 15B is a cross-sectional view of another core wire alignment section that is substitutable for the core wire alignment section of FIG. 13.
Figure 15C:
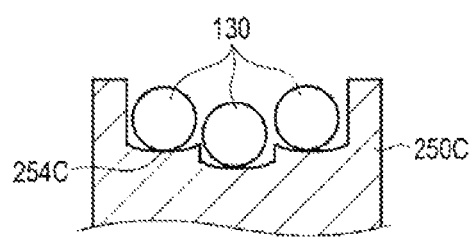
FIG. 15C is a cross-sectional view of another core wire alignment section that is substitutable for the core wire alignment section of FIG. 13.

FIGS. 15A, 15B, and 15C are cross-sectional views of other core wire alignment sections 250A, 250B, and 250C, respectively, which may be alternative to the core wire alignment section 250 of FIG. 13.

In the core wire alignment section 250A illustrated in FIG. 15A, the bottom surface of the groove 254A has an elliptical cross-sectional shape.

In the core wire alignment section 250B illustrated in FIG. 15B, the bottom surface of the groove 254B has a stair type cross-sectional shape in order to stabilize the amount of misalignment in the radial direction in the core wire alignment section 250B of the adjacent three single-core covered optical fibers 130.

In the core wire alignment section 250C illustrated in FIG. 15C, the bottom surface of the groove 254C has a cross-sectional shape having three concave portions in order to stabilize the amount of misalignment in the radial direction in the core wire alignment section 250B of the adjacent three single-core covered optical fibers 130 and the distance between the adjacent three single-core covered optical fibers 130 in the width direction of the core wire alignment section 250B.

In the present embodiment, the manufacturing apparatus 200C of the intermittent tape core wire 140 is described as including three single-core covered optical fiber feed-out sections 210C, but it is also possible to include four or more single-core covered optical fiber feed-out sections 210C. In this case, the four or more single-core covered optical fibers 130 received in the groove 254 of the core wire alignment section 250 are aligned in a form in which the centers of the single-core covered optical fibers 130 are not located on one straight line in the cross-section of the optical fibers.

The present invention is not limited to the embodiments described above, but various changes and modifications can be made without departing from the gist of the present invention. Furthermore, the embodiments may be implemented in combination appropriately as long as it is possible, and in this case, combined effects can be obtained. Further, the above embodiments include inventions on various stages, and various inventions may be extracted by appropriate combinations of the disclosed multiple configuration requirements.

REFERENCE SIGNS LIST

100 Optical fiber cable
130, 130A, 130B, 130C, 130D Single-core covered optical fiber
140, 140A Intermittent tape core wire
142 Bonding portion
144 Protruding portion
160 Core wire unit
162 Press winding member
180 Cable core
182 Press winding member
190 Jacket
192 Tensile member
194 Rip cord
200A, 200B, 200C Device for manufacturing optical fiber cable
210A, 210C Single-core covered optical fiber feed-out section
220 Alignment orientation control section
230A, 230B Core wire assembling section
240 Deformation imparting section
242 Shaft
244 Groove
250, 250A, 250B, 250C Core wire alignment section
252 Shaft
254, 254A, 254B, 254C Groove
260 Core wire bonding section
$D1_{kl}$, $D1_{km}$ Bonding portion direction
$D2_{kl}$ Core wire twisting direction
$D2_{km}$, $D2_{lk}$, $D2_{lp}$ Core wire twisting direction
D3 Projection direction
F External force
W Width
$\theta$ Difference in core wire twisting directions

The invention claimed is:

1. An optical fiber cable, wherein
an intermittently bonded optical fiber tape core wire is assembled into a cable core and subjected to application of a jacket, in which the intermittently bonded optical fiber tape core wire is provided with bonding portions at a plurality of locations two dimensionally in a longitudinal direction and in a width direction, the bonding portions bonding two adjacent cores of three or more single-core covered optical fibers that are multi-core optical fibers having a plurality of cores and subjected to application of a cover on an outer periphery, wherein
the intermittently bonded optical fiber tape core wire is assembled into the cable core so that with respect to a k core wire located in the center and an l core wire and an m core wire located on both sides among core wires of three single-core covered optical fibers continuously adjacent in the width direction, a difference between a core wire twisting direction of the k core wire at a bonding portion connecting the k core wire and the l core wire and a core wire twisting direction of the k core wire at a bonding portion connecting the k core wire and them core wire is different from when manufactured
wherein the l core wire is located at an end in the width direction of the intermittently bonded optical fiber tape core wire,
the intermittently bonded optical fiber tape core wire includes a protruding portion provided on the l core wire,
the protruding portion is disposed at a position different from a position of a bonding portion connecting the l core wire and the k core wire with respect to a longitudinal direction of the optical fibers, and
the intermittently bonded optical fiber tape core wire is assembled into the cable core so that a projection direction of the protruding portion with respect to a straight line connecting the center of the l core wire and the center of the k core wire in the cross-section of the optical fibers is different from when manufactured.

2. The optical fiber cable according to claim 1, wherein a mounting density of the core wire of the optical fiber cable is greater than or equal to 8.4 core wires/mm$^2$.

3. The optical fiber cable according to claim 1, wherein in the intermittently bonded optical fiber tape core wire, the center of the k core wire is not located on a straight line connecting the center of the l core wire and the center of the m core wire in the cross-section of the optical fibers in a state of manufacturing.

4. A device for manufacturing an optical fiber cable comprising:
a plurality of core wire feed-out sections configured to feed out a plurality of intermittently bonded optical fiber tape core wires each including a plurality of multi-core optical fibers,
a plurality of alignment orientation control sections configured to control alignment orientations of the plurality of intermittently bonded optical fiber tape core wires so that lined-up orientations of the core wires of the fed out plurality of intermittently bonded optical fiber tape core wires are different from each other, and
a core wire assembling section configured to assemble the plurality of intermittently bonded optical fiber tape core wires into a cable core while maintaining the lined-up orientations of the core wires.

5. A method for manufacturing an optical fiber cable comprising:
feeding out a plurality of intermittently bonded optical fiber tape core wires each including a plurality of multi-core optical fibers,
controlling alignment orientations of the plurality of intermittently bonded optical fiber tape core wires so that lined-up orientations of the core wires of the fed out plurality of intermittently bonded optical fiber tape core wires are different from each other, and
assembling the plurality of intermittently bonded optical fiber tape core wires into a cable core while maintaining the lined-up orientations of the core wires.

6. An optical fiber cable, wherein
an intermittently bonded optical fiber tape core wire is assembled into a cable core and subjected to application of a jacket, in which the intermittently bonded optical fiber tape core wire is provided with bonding portions at a plurality of locations two dimensionally in a longitudinal direction and in a width direction, the bonding portions bonding two adjacent cores of three or more single-core covered optical fibers that are multi-core optical fibers having a plurality of cores and subjected to application of a cover on an outer periphery, wherein
the intermittently bonded optical fiber tape core wire is assembled into the cable core so that with respect to a k core wire located in the center and an l core wire and an m core wire located on both sides among core wires of three single-core covered optical fibers continuously adjacent in the width direction, a difference between a core wire twisting direction of the k core wire at a bonding portion connecting the k core wire and the l core wire and a core wire twisting direction of the k core wire at a bonding portion connecting the k core wire and them core wire is different from when manufactured,
wherein, prior to the optical fiber cable being twisted, a center of cross-section of the k core wire is not located on a straight line connecting a center of cross-section of the l core wire and a center of cross-section of the m core wire.

* * * * *